(12) United States Patent
Tiberi et al.

(10) Patent No.: US 10,390,411 B2
(45) Date of Patent: Aug. 20, 2019

(54) CONTROLLING LIGHTING USING SPATIAL DISTRIBUTION OF USERS

(71) Applicant: SIGNIFY HOLDING B.V., Eindhoven (NL)

(72) Inventors: Luca Tiberi, Eindhoven (NL); Ralf Gertruda Hubertus Voncken, Eindhoven (NL); Maurice Herman Johan Draaijer, Ittervoort (NL); Johannes Petrus Wilhelmus Baaijens, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/087,164

(22) PCT Filed: Mar. 20, 2017

(86) PCT No.: PCT/EP2017/056494
§ 371 (c)(1),
(2) Date: Sep. 21, 2018

(87) PCT Pub. No.: WO2017/162550
PCT Pub. Date: Sep. 28, 2017

(65) Prior Publication Data
US 2019/0116645 A1  Apr. 18, 2019

(30) Foreign Application Priority Data

Mar. 24, 2016  (EP) ...................................... 16162125
Oct. 27, 2016  (EP) ...................................... 16195988

(51) Int. Cl.
*H05B 37/02* (2006.01)
*F21V 23/04* (2006.01)

(52) U.S. Cl.
CPC ..... *H05B 37/0227* (2013.01); *H05B 37/0272* (2013.01); *F21V 23/0471* (2013.01)

(58) Field of Classification Search
CPC .. H05B 37/02; H05B 37/029; H05B 37/0227; H05B 37/0272; H05B 37/0245;
(Continued)

(56) References Cited

U.S. PATENT DOCUMENTS 8,193,713 B2 *  6/2012  Jung ...................... H05B 35/00
 315/158
9,456,183 B2 *  9/2016  Brackney ........... G06K 9/00771
(Continued)

FOREIGN PATENT DOCUMENTS

CN     201781663 U    3/2011
DE    102005029728 A1   1/2007
(Continued)

*Primary Examiner* — Haissa Philogene
(74) *Attorney, Agent, or Firm* — Akarsh P. Belagodu (57) ABSTRACT

A method of automatically commissioning a lighting system comprising a plurality of luminaires for illuminating one or more regions within a space. The method comprises: receiving signals from a positioning system, indicating a respective location within the space at which each of a plurality of physical entities is detected by the positioning system, each of the entities being a person or a movable nonhuman object. The method further comprises determining a spatial distribution of at least some of the entities based on the locations indicated by the signals from the positioning system, and determining a region within the space corresponding to this spatial distribution. The method then comprises identifying a group of the luminaires that are arranged to illuminate the determined region and storing identifiers of those luminaires together as a group in a commissioning database.

15 Claims, 3 Drawing Sheets

(58) Field of Classification Search
CPC ............ H05B 33/0854; H05B 33/0869; H05B 33/0845; G05B 2919/163; G05B 2919/2642; G05B 2219/25011; G05B 2219/25168; Y02B 20/44; F21V 23/0471
See application file for complete search history.

(56) References Cited

U.S. PATENT DOCUMENTS

| | | | | |
|---|---|---|---|---|
| 9,497,832 | B2* | 11/2016 | Verberkt | H05B 37/0227 |
| 9,615,434 | B2* | 4/2017 | Vangeel | G06F 8/654 |
| 2014/0285113 | A1 | 9/2014 | Huang | |
| 2015/0035440 | A1* | 2/2015 | Spero | B60Q 1/04 |
| | | | | 315/153 |

FOREIGN PATENT DOCUMENTS

| | | |
|---|---|---|
| DE | 102006024512 A1 | 11/2007 |
| EP | 2369900 A1 | 9/2011 |
| GB | 2481721 A | 1/2012 |
| JP | 2007005261 A | 1/2007 |
| WO | 2009090598 A1 | 7/2009 |
| WO | 2015025235 A1 | 2/2015 |

\* cited by examiner

CONTROLLING LIGHTING USING SPATIAL DISTRIBUTION OF USERS

CROSS-REFERENCE TO PRIOR APPLICATIONS

This application is the U.S. National Phase application under 35 U.S.C. § 371 of International Application No. PCT/EP2017/056494, filed on Mar. 20, 2017, which claims the benefit of European Patent Application No. 16162125.5, filed on Mar. 24, 2016 and European Patent Application No. 16195988.7, filed on Oct. 27, 2016. These applications are hereby incorporated by reference herein.

TECHNICAL FIELD

The present disclosure relates to controlling the illumination emitted by one or more luminaires into a space, e.g. retail space or a space used in the hospitality industry.

BACKGROUND

Digitally controllable lighting provides more possibilities than functional or simple decorative lighting. The presence of multiple controllable illumination sources in the same room or area makes it possible to create lighting effects that are variable in space and time. These lighting effects can include changes in light intensity, colour, colour temperature, and/or spatial distribution of the light (depending on the type of illumination sources and related drivers available). More and more, lighting is perceived by end users not only as a functional need, but also as something to use to create an atmosphere or ambience in a given space.

For instance, atmosphere creation can be beneficial for retailers. E.g. a suitable lighting atmosphere in a physical store can provide customers with a shopping experience that differentiates the store from handy online shopping, or that differentiates it from other nearby stores. As another example, a lighting atmosphere can also be used to attract customers to a particular display or product area, or influence their shopping habits. Nonetheless, advanced digitally controllable lighting still has a relatively low market penetration in retail due to difficult and costly commissioning and recommissioning procedures. These costs apply not only to the first set up of a new system, but also to the periodic or frequent reconfigurations of stores (for example when new promotions are being displayed, or when in-store furniture such as shelving, display stands, product bins and/or points-of-sale are shifted around to different locations within the store, e.g. seasonally or when there is a sale). Current state of the art commissioning tooling allows only for the creation lighting scenes on a fixed basis based on the intended usage of the lighting system. When the store is reconfigured, the scenes have to be manually redesigned.

Some known lighting systems use presence sensors to dynamically adapt the lighting in dependence on occupancy, to turn on and off or dim up and down the light in a given area in dependence on whether a person is detected to be present in that given area. WO2009/090598 also discloses adapting a lighting atmosphere in a given area, e.g. a shop, in dependence on the sensed occupancy in that area.

Patent application DE 102005029728 A1 relates to an arrangement for controlling the intensity of road lighting, comprising one or more mobile devices which can be identified, a network for locating these mobile devices, one or more road lighting elements and a controller for receiving information about the location of the mobile devices and for determining appropriate road lighting requirements therefrom and for controlling the road lighting elements accordingly. The controller may control only road lighting elements in the direct vicinity of, for example, pedestrians, motorists or cyclists, and the remaining lighting of main traffic routes can be dimmed or turned off completely in certain areas. The illuminated zone 'moves' with the mobile device and thus with its carrier.

Patent application GB 2481721A relates to a mobile telecommunications network including a core and a radio access network having radio means for wireless communication with mobile terminals registered with the network, wherein the radio access network includes control means operable to control the use of network resources by said mobile terminals, wherein the control means is operable to collect information relating to said mobile terminals (e.g. location, movement) and to control the operation of external resources, such as street furniture in the vicinity of the each of the mobile terminals, in dependence on the information.

SUMMARY

Commissioning, for the present purposes, refers to creating a group of luminaires by storing the IDs of the grouped luminaires in a commissioning database along with some indication that they form a group so that they can be controlled together as a group. Existing systems like WO2009/090598 may control the light emitted by a luminaire or by a given, already-defined group of luminaires in dependence on occupancy, but they do not allow for automatic commissioning "in the field". It would be desirable to adapt the commissioning of luminaires in a space, and therefore the lighting atmosphere they provide, in a space such as a store to the current, real-life usage needs of the moment. Particularly, as recognized herein, improved flexibility could be achieved by automatically grouping luminaires in dependence on a detected spatial distribution of people and/or nonhuman objects.

According to one aspect disclosed herein, there is provided equipment for automatically commissioning a lighting system comprising a plurality of luminaires for illuminating one or more regions within a space. The equipment comprises: a positioning system interface configured to receive signals from a positioning system, indicating a respective location within said space at which each of a plurality of physical entities is detected by the positioning system, each of the entities being a person or a movable nonhuman object. The equipment also comprises a controller configured to determine a spatial distribution of at least some of said entities based on the locations indicated by the signals from the positioning system, and to determine a region within said space corresponding to said spatial distribution (said region being smaller than said space). Further, the controller is configured to identify a group of the luminaires that are arranged to illuminate said region (the group of luminaires being fewer than the plurality of luminaires of the lighting system), and to store identifiers of these luminaires together as a group in a commissioning database.

Thus there is provided a means for automatically creating groups of lighting devices based on the formation of people and/or moveable assets detected in a space. The system is arranged to detect locations of people and/or objects in a space (e.g. shop, office or hotel) in order to detect the distribution of one or more groups of people and/or objects in a specific area, and then to create one or more groups of luminaires that belong to the area where the group of people and/or objects is formed, so that a given group of luminaires can be controlled together as one item. By adapting the grouping of luminaires in dependence on the sensed grouping of people and/or objects, this can advantageously reduce the duration and/or cost of commissioning and/or recommissioning in lighting systems in professional buildings (e.g. retail). Instead of requiring manual commissioning or recommissioning, the system acts to automatically accommodate the real usage needs of the moment, or needs that are identified from the analysis of data concerning the actual usage of the building or the like. Such flexibility may be beneficial not only in a retail environment, but also other environments such as in the hospitality sector or in an office.

In embodiments, the controller may be configured to determine said region within said space corresponding to said spatial distribution if said spatial distribution of said entities has been the same over a predetermined period of time. In other words, the controller may be arranged for determining the locations of the physical entities over time, and identify the group of luminaires that are arranged to illuminate said region and to store the identifiers of the luminaires of the group together as the group in the commissioning database only if the physical entities have been present at or nearby the locations during the predetermined period of time. Thus, the luminaires may be grouped only when the physical entities are located at or nearby the locations for a longer period of time. This is advantageous, because the grouping does not change too often, which enables a system operator (e.g. a store owner) to keep an overview of the created groups. The predetermined period of time may, for example, be at least at least 5 seconds, at least 10 seconds, at least one minute, at least one hour, etc, depending on the requirements of a specific context. The predetermined period of time may be adjustable via a user interface. The predetermined period of time may be dependent on the type of the physical entities (the predetermined period of time may for example be different for persons (e.g. 20 seconds) compared to movable nonhuman objects (e.g. 20 minutes)).

In embodiments, the controller may be configured to store information on said region or locations in a database; and to repeat, on multiple occasions over a period of time, the receiving of the signals from the positioning system, the determination of the spatial distribution of entities and the corresponding region within the space based on the received signals, and the storing of said information. The controller then analyses the stored information from the multiple occasions in order to estimate a time-varying distribution of the people and/or nonhuman movable objects over said period, and performs the determination of said group of luminaires based on the time-varying distribution evaluated at a current time within a successive instance of said period.

Thus by storing information on the distribution of the people or objects in a database, it is possible to identify group dynamics over a period time within a given space such as a store or the like, i.e. to identify patterns of behaviour or movement over at least one instance of a repeating period such as a day, week, month or year. It can then be predicted that the distribution pattern is likely to repeat in a subsequent instance of the period in question, or extrapolated that a related distribution is likely to occur in a subsequent instance of the period, in order to create one or more groups of luminaires based on the predicted or extrapolated distribution patterns. E.g. if last week it was detected that greater than a certain predetermined number of customers bunched around a certain area at a certain time of day and/or week (e.g. Friday lunchtime), then it can be identified that a group of luminaires should automatically be created around that same area this week (e.g. this coming Friday lunchtime).

In embodiments, the equipment may comprise a lighting interface configured to enable the controller to control the illumination emitted by the luminaires; and the controller may be further configured to selectively control the illumination emitted by the group luminaires based on said creation of the group of luminaires.

For example, preferably the lighting control equipment comprises a user interface, and the controller may be configured such that said selective control comprises: outputting an indication of the identified group of luminaires to a user via the user interface, and in response receiving back a user input via the user interface by which the user selects to control the group of luminaires (by reference to the group as a whole rather than individually selecting individual luminaires), then controlling the illumination emitted by the group of luminaires based on said user input. Thus there is provided a user interface that displays the automatically formed groups of illumination sources and the related control possibilities (e.g. increase of the light level, change colours, etc.) to a user such as a store manager, thereby assisting the user in quickly and easily adapting the lighting to the current needs.

In embodiments the control of the illumination emitted by said group of luminaires may comprise: controlling an intensity, colour, spatial distribution, and/or dynamic effect of the illumination.

In embodiments, the controller may be further configured so as, subsequent to the determination of said group of luminaires, to operate the positioning system interface to receive one or more further signals from the positioning system, indicative of a respective updated location of each of one or more of said plurality of physical entities, and/or of one or more newly present physical entities being people and/or nonhuman movable objects newly detected in the space. The controller may be configured to then determine an updated spatial distribution based on the updated locations, and determine an updated region within the space corresponding to the updated spatial distribution (the updated region again being smaller than said space); and in place of said group, to identify an updated group of the luminaires that are arranged to illuminate the updated region, and store identities of the updated group of luminaries together as a group in a commissioning database (the updated group again being fewer than said plurality of luminaires of the lighting system).

Thus the controller is advantageously able not only to automatically commission the lighting system, but to do so dynamically, i.e. to automatically commission and then recommission the lighting adaptively in response to changing conditions. For example as the historical data on peoples' distribution is updated, or when the layout of the store changes, then the controller can detect this and automatically recommission the lighting system accordingly.

As mentioned, the entities based upon which the grouping of luminaires is performed may be people, movable nonhuman objects, or a combination of both. In the case of nonhuman objects, these may be nonanimal objects, non-living objects and/or inanimate objects. For instance, the nonhuman objects may comprise one or more items of furniture, animatronic exhibits, plants, animals, or autonomous robots. Note that the term "furniture" as used herein is not limited to furniture in the home. Particularly, in embodiments the nonhuman movable objects may comprise one or more items of retail furniture such as shelves, clothes racks, product bins, counters, points of sale, and/or promotional displays. E.g. in a retail environment the controller may be configured to detect locations of moveable assets (e.g. clothes racks, desks) in the space in order to automatically create groups of luminaires based on this information In embodiments, for each respective one of one, some or all of said entities, the positioning system is arranged to detect the location of the respective entity by reference to wireless signals transmitted between a mobile device attached to or carried by the respective entity and a plurality of reference nodes within range of the mobile device. E.g. the mobile device may be a smart phone or tablet carried about the person, or a tracking tag attached to a tracked nonhuman asset.

In particular embodiments, one or more of the mobile devices may be wearable devices worn by the receptive people. For instance, nowadays innovative "smart devices" providing wearable user interfaces are increasingly being released in the market, e.g. smartwatches, smart bracelets, smart rings, smart glasses and smart hats ("smart" here referring to having one or more embedded pressing units arranged to run software for providing various functionality). Amongst other functions, these devices provide new sensing modalities directly on the body of the user, and may be connected to another device or system either locally and/or via the Internet. Such sensing modalities can be used to detect both activities of the user and characteristics of the user. Future penetration of these devices provides the opportunity for the diffusion of indoor positioning systems (IPS), which can detect location of people (or objects) in a closed environment. Different technologies can enable determination of the location, either requiring user interaction (such as QR codes or NFC tags to be read via a smart device), or not requiring user interaction (such as RF triangulation). Accuracy depends on building architecture and usage and on technology used, but even a rough accuracy of e.g. about 1 meter is good enough for several applications, even though higher accuracy may be desired.

In alternative or additional embodiments, for each respective one of one, some or all of said people, the positioning system may be arranged to detect the location of the respective person based on detecting a wireless signal emitted by or reflected from the respective person's body. For example the space may be equipped with one or more presence sensors which operate by detecting heat emitted from the peoples bodies (e.g. passive infrared sensors), or by detecting motion of the people's bodies (e.g. radar or active ultrasound sensors).

In further alternative or additional embodiments, for each respective one of one, some or all of said people, the positioning system may be arranged to detect the location of the respective person based on the user interacting with a reference point in said space. For example, the reference point may take the form of a visible code (e.g. QR code) or an NFC tag disposed at a known location within in the space, and a person's location may be detected when that person uses a camera or other signal reader (e.g. RF reader) on-board his or her portable user device to detect the code or tag (or conversely the reference point may comprise a camera or reader which detects the location by detecting a visible code or NFC tag on the portable device).

In embodiments said space may be an indoor space. In embodiments said positioning system may be an indoor positioning system. In embodiments said space may be open to the public. In embodiments said space may be a retail space, such as the interior of a shop or mall. Alternatively in embodiments said space may be a space used for hospitality, or may be an office space, or any other type of space.

According to another aspect disclosed herein, there is provided a computer program product for automatically commissioning a lighting system comprising a plurality of luminaires for illuminating one or more regions within a space, wherein the computer program product comprises code embodied on a computer-readable storage medium and configured so as when run on one or more processing devices to perform operations of: receiving signals from a positioning system, indicating a respective location within said space at which each of a plurality of physical entities is detected by the positioning system, each of the entities being a person or a movable nonhuman object; determining a spatial distribution of at least some of said entities based on the locations indicated by the signals from the positioning system, and determining a region within said space corresponding to said spatial distribution, said region being smaller than said space; and identifying a group of the luminaires that are arranged to illuminate said region and storing identifiers of the luminaires of the group together as a group in a commissioning database, the group of luminaires being fewer than the plurality of luminaires of the lighting system.

According to another aspect disclosed herein, there is provided a method of automatically commissioning a lighting system comprising a plurality of luminaires for illuminating one or more regions within a space, wherein the method comprises: receiving signals from a positioning system, indicating a respective location within said space at which each of a plurality of physical entities is detected by the positioning system, each of the entities being a person or a movable nonhuman object; determining a spatial distribution of at least some of said entities based on the locations indicated by the signals from the positioning system, and determining a region within said space corresponding to said spatial distribution, said region being smaller than said space; and identifying a group of the luminaires that are arranged to illuminate said region and storing identifiers of the luminaires of the group together as a group in a commissioning database, the group of luminaires being fewer than the plurality of luminaires of the lighting system.

In embodiments the lighting control equipment, system, computer program product and/or method may be further configured in accordance with any of the features mentioned above or described elsewhere herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The following describes a system for reducing the duration and cost of commissioning and/or recommissioning of lighting systems in professional buildings (e.g. for retail), by increasing the flexibility of the system in order to accommodate needs of the moment or needs that arise from the analysis of data concerning the usage of the building. Embodiments enable the creation of groups of luminaires to be controlled by a store manager via a dedicated user interface, based on a detected spatial formation of one or more groups of people (as determined by an indoor positioning system) and/or based on the position of moveable in-store furniture such as racks, point of sale (POS), etc.

As will be discussed in more detail shortly, embodiments use an indoor positioning system (IPS) to detect the locations of people in a space (e.g. shop, office, hotel) and detect a formation of one or more groups of people in a specific area; and then to automatically create one or more groups of luminaires that belong to the area where the group of people is formed and that can be controlled together as one item. In some embodiments, the system also stores the information from the IPS in a database and analyses the stored data to detect group dynamics over time in the store, in order to automatically create groups of luminaires based on the real visiting patterns in the space. In further embodiments, the IPS may be used to detect location of moveable assets (e.g. clothes racks, desks) in the space in order to automatically create groups of luminaires based on this information. The system also provides a user interface for the user of the lighting system (e.g. the store manager), the user interface being arranged to display the automatically formed groups of luminaires and the related control possibilities, which in turn can be used by the user to trigger a specific lighting effects for those groups (e.g. increase of the light level, change colour, etc.).

Figure 1:
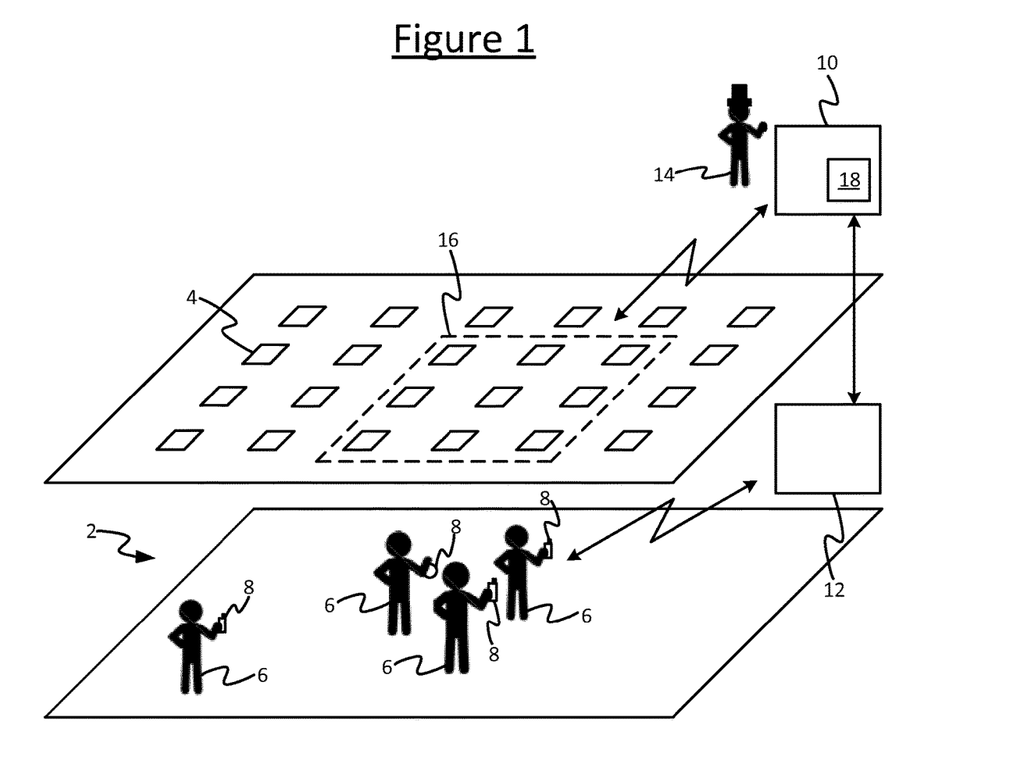
FIG. 1 is a schematic illustration of an environment comprising a lighting system and multiple people occupying the environment.

FIG. 1 illustrates an example environment 2 served by a lighting system 4, 10 in accordance with embodiments disclosed herein. The environment 2 is a physical space which is occupiable by multiple humans 6 (i.e. fit for occupancy by multiple humans). The space 2 may comprise an indoor space such as the interior of a shop (store), mall, bar, hotel, restaurant or nightclub. Alternatively or additionally the space 2 may comprise an outdoor space such as a park in which an event such as market or fete is being held, and/or a partially covered space such as a covered market. In particular embodiments discussed herein the space is a retail space, e.g. a store such as a clothes store, or a mall, indoor or outdoor market, or a hall in which a trade show is being held. Nevertheless, in other embodiments the teachings herein can alternatively be applied to other types of space 2, e.g. a space used in the hospitality industry such as a hotel, bar, restaurant, nightclub, ballroom, or cruise ship; or an office space comprising one or more office areas such as an open plan office area, one or more office rooms and/or one or more meeting rooms; or indeed other spaces, especially those open to the public, such as a museum.

The lighting system 4, 10 comprises plurality of luminaires 4 arranged to illuminate some or all of the space 2, each either being located in the space 2 itself or at least being disposed so that its illumination is cast into the space 2. Each luminaire 4 comprises at least one respective lamp (lighting element) arranged to generate the respective illumination, plus any associated housing, socket and/or support. E.g. each lamp may comprise an LED-based lamp, a filament bulb, or a gas discharge lamp (and the different luminaires need not necessarily use the same type of lamp). The lighting system 4, 10 further comprises lighting control equipment 10 comprising a lighting controller 18 operatively coupled to the luminaires 4 so as to be able to control the illumination emitted from each of the luminaires 4.

The space 2 is also served by a positioning system 12 arranged to detect the physical location of each of at least some of the people 6 found within the space 2, i.e. the spatial coordinates of each such person in at least two spatial dimensions (typically in the plane of the floor, and typically in terms of Cartesian x and y coordinates in that plane). The term "positioning" herein refers to the act of detecting the physical location of a person or other object, sometimes also called "localization".

As will be discussed in more detail shortly, in accordance with the present disclosure the lighting control equipment 10 is configured to set a grouping 16 of the luminaires 4 based on an input from the positioning system 16, and to operate such that the control of the emitted illumination is based on this grouping 16. This may comprise outputting an indication of the grouping 16 to a user 14 (e.g. store manager) via a suitable user interface of the lighting control equipment 10, such that the user 14 can select to control the grouped luminaires 4, 16 as a group based on the indicated grouping 16.

The positioning system 12 may operate based on any one of a number of possible localization technologies.

According to one possibility, the positioning system 12 works by detecting the position of a mobile device 8 disposed about the person of each of the people 6 being detected, on the assumption that the mobile device 8 is approximately collocated with its respective person 6 (its user). In such cases the mobile device 8 may be carried in the hand of the person 6, or carried by the person 6 in a pocket or bag, or may be worn on the person's body. For instance in embodiments any given one of the mobile devices 8 may take the form of handheld device such as a smartphone or tablet, or may take the form of a wearable device such as a smart watch, smart bracelet, smart ring or smart hat. The mobile device 8 may take the form of a dedicated tracking device (e.g. a tracking tag worn by the person 6 in question); or the mobile device 8 may take the form of a general purpose user terminal (e.g. smartphone, tablet, smartwatch or smart-glasses), which happens to be present in the space 2 based on its collocation with the respective person 6 and which based on this is exploited for the purposes disclosed herein. Note also that each of the mobile devices 8 of the different people 6 need not necessarily all be of the same kind, and may comprise a mixture of handheld devices and wearables, and/or a mixture of general purpose user terminals and dedicated tracking devices.

In such embodiments, the positioning system 12 comprises a plurality of reference nodes (not shown) disposed at different known locations that are known to the positioning system, e.g. based on the positioning system having access to a database mapping IDs of the nodes to their respective coordinates. The positioning system 12 is configured to detect the location of the mobile device 8 (and therefore the respective person 6) by reference to a plurality of wireless "beacon" signals transmitted between the mobile device 8 and a respective plurality of reference nodes. The plurality of reference nodes used for any given localization operation may be all the reference nodes of the system or just a subset of a wider network or arrangement of available reference nodes. Note also that the localization can be performed in a device centric manner or a network centric manner. In a network centric approach, the mobile device 8 emits beacons signals to be received by the reference nodes, and the reference nodes take measurements of these such as received signal strength (e.g. RSSI), time of flight (ToF) and/or angle of arrival (AoA). The positioning system 12 then computes the location of the mobile device 8 (and hence the corresponding person 6) based on a localization computation technique such as triangulation, trilateration, multilateration or fingerprinting. In a device centric approach the beacon signals are emitted from the reference nodes and received by the mobile device 8. The mobile device 8 takes the measurements of these signals, and then either performs the localization computation based on these measurements locally at the mobile device and returns the computer location to the positioning system 12, or else returns the raw or partially-processed measurements to the positioning system 12 for the computation to be performed there.

The reference nodes may take any of a variety of different possible forms. For instance in embodiments the reference nodes may take the form of dedicated reference nodes included in or within range of the space 2 specifically for the purpose of localization, i.e. emitting dedicated beacon signals or with the dedicated purpose of detecting beacons emitted by the mobile device 8. Alternatively the reference nodes may be pre-existing nodes that are already beaconing for some other primary purpose, and wherein this beaconing is exploited for a secondary purpose of localization. For instance the reference nodes may be wireless access points (APs) which emit beacons to advertise the availability of a wireless local area network (WLAN). Either way, whether dedicated reference nodes or not, the beacon signals may be transmitted in accordance with any suitable wireless technology such as Wi-Fi, Bluetooth, ZigBee or Thread. In further examples, the positioning system 12 could be a satellite based positioning system such as GPS, GLONASS or Galileo, in which the reference nodes are satellites. In embodiments, a combination of different reference node types may also be used.

In embodiments where the space 2 is an indoor space, the positioning system may be referred to an indoor positioning system (IPS). Such a system uses a location technology other than a satellite based positioning system (which typically cannot penetrate indoors). Nonetheless, in other embodiments the positioning system may be arranged to operate in an outdoor space or partially covered space, whether based on satellite technology or otherwise.

Another possibility for localization is not to detect a mobile device 8, but rather to detect the body of the person 6. In this case the positioning system 12 comprises a plurality of presence sensors (not shown) located in or at least within range of the space 2 in question, wherein the presence sensors either detect a signal given off by the person's body (passive presence sensors), or emit a signal which reflects from the person's body and the reflection is detected by the sensor (active presence sensors). There are again various ways of achieving such positioning, as will be familiar to a person skilled in the art. For instance, the presence sensors may comprise passive infrared (PIR) sensors arranged to detect the infrared signals given off by the human body due to its heat. Alternately the presence sensors may comprise radar or active ultrasound sensors which emit a radio or ultrasound signal, respectively, and detect the reflection of this from a person's body if present in the space 2. E.g. these may work by detecting a Doppler shift in the reflected signal relative to the emitted signal, thereby detecting motion which is assumed to be the motion of a person 6. In yet another example, the presence sensors may comprise one or more 2D cameras or 3D (depth aware) cameras, plus an image recognition algorithm (e.g. facial recognition algorithm or body recognition algorithm) running on the positioning system 12 in order to detect people 6 in the images captured by the camera(s).

A yet further possibility is to detect the location of a person 6 by detecting when that person interacts by means of a proximal interaction with a known reference point in the space 2. For instance the space 2 may be equipped with a plurality of near-field communication (NFC) tags or NFC readers, such as RF (radio frequency) ID tags or RF ID readers. At least some of the people's mobile devices 8 (e.g. smartphones or wearables) may each also be equipped with a complementary NFC reader or tag, respectively (e.g. an RF ID reader or tag). When the person 6 touches the tag of the mobile device 8 up against (or at least in proximity to) the reader at the reference point, it detects the tag and thus detects that the person 6 must be present at the location of the reference point. Or alternatively when the person 6 touches the reader of the mobile device 8 up against (or at least in proximity to) the tag at the reference point, the mobile device detects the tag and reports this to the positioning system 12, thus informing the positioning system 12 that the person 6 is present at the location of the reference point. In a variant of such approaches, the tag may instead take the form of a visible, identifiable mark such as a 2D or 3D barcode (e.g. QR code), and the reader may take the form of a camera plus image recognition algorithm configured to detect the mark in images captured by the camera. Again the mark and camera may be placed either way round on the reference point and mobile device 8 (analogous to a device centric and network centric approach as discussed earlier).

Note also: a combination of different localization technologies may also be used together in order to achieve a better location fix.

Figure 2:
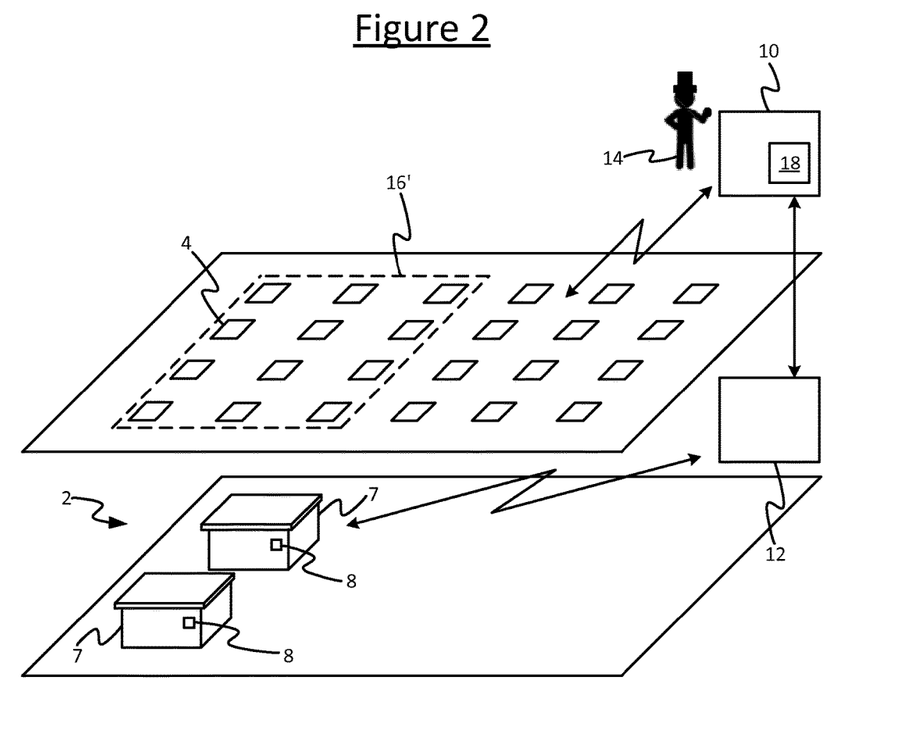
FIG. 2 is a schematic a schematic illustration of an environment comprising a lighting system and multiple non-living objects occupying the environment.

FIG. 2 illustrates a variant of the scenario illustrated in FIG. 1. Here instead of people 6, the positioning system 12 is configured to detect the position of each of a plurality of nonhuman objects 7 (again in at least two dimensions, preferably at least in the plane of the floor, in coordinates such as Cartesian x and y coordinates in that plane). In this case the positioning system 12 may be arranged to detect the positions of the objects 7 by detecting the position of a respective mobile device 8 in the form of tracking tag 8 attached to or disposed within each of the objects 7. The detection of the positions of the objects 7 may work based on an arrangement of reference nodes, using any of the localization techniques as already discussed above in relation to FIG. 1 (e.g. device centric or network centric triangulation, trilateration, multilateration or fingerprinting based on exchange of dedicated or incidental beacons between the tracking tag 8 and a plurality of the reference nodes). As another example, the positioning system 12 may comprise one or more 2D or 3D cameras plus an image recognition algorithm configured to detect the positions of the objects 7 in the captured images.

Each of the nonhuman objects 7 being detected may for example take the form of: an item of furniture, a static or animatronic exhibit, an autonomous robot, a plant or arrangement of plants, or an animal or animal enclosure. The different objects 7 may be of the same kind or a combination of different kinds. E.g. in embodiments where the space 2 is a retail space, the detected objects 7 may comprises items of retail furniture such as shelving units, clothes racks, product displays, product bins, promotional displays, and/or points of sale (POSs). Or in embodiments where the space 2 is an office space, the detected objects 7 may comprise for example desks, chairs, shelving units, and/or photocopiers. Or in embodiments where the space 2 is a museum or part of a museum, the detected objects 7 may comprise different museum pieces and/or exhibits. Or in embodiments where the space 2 is a park, garden or garden centre, the detected objects 7 may comprise plants or plant displays. Or in embodiments where the space of 2 is a pet store, zoo or petting zoo, each of the detected objects may comprise a different animal enclosure.

Figure 3:
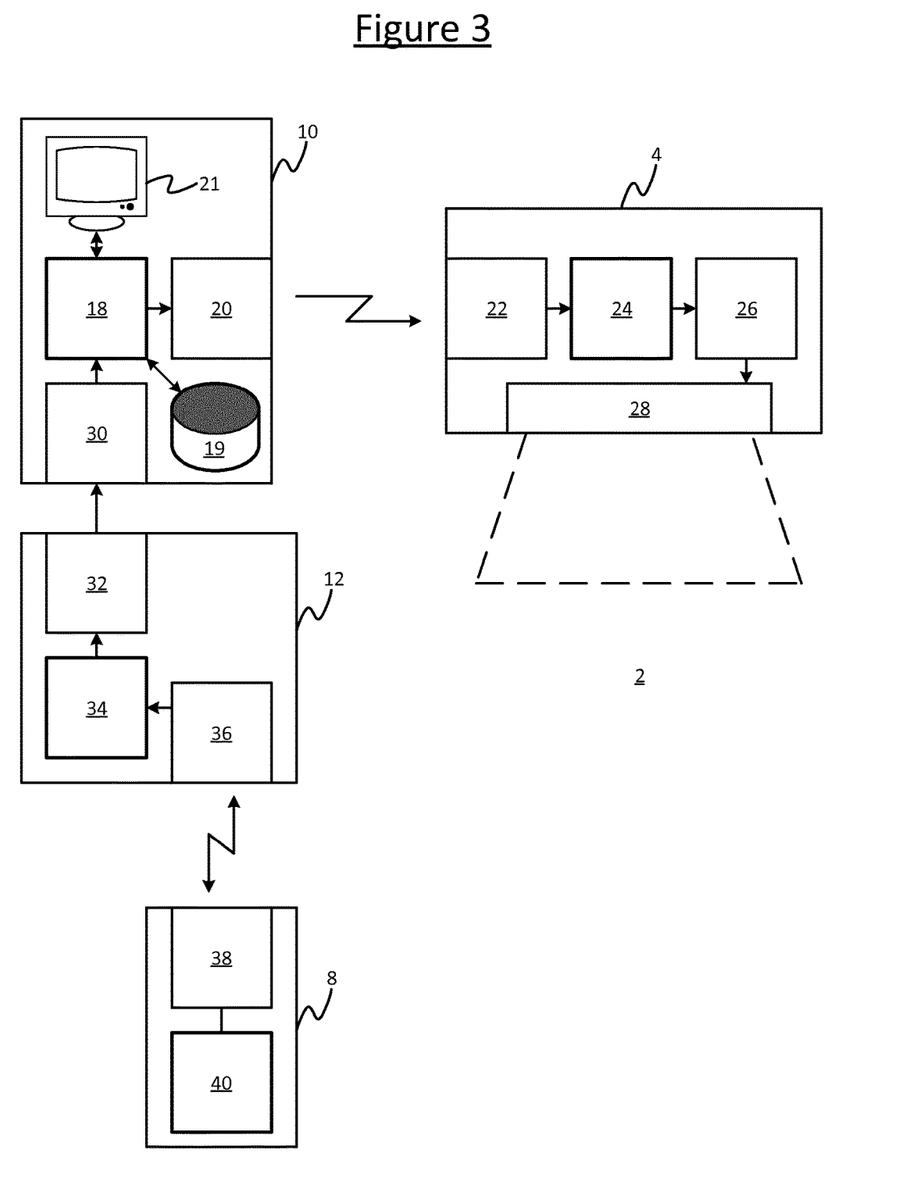
FIG. 3 is a schematic block diagram showing interaction between a lighting system and a positioning system.

FIG. 3 illustrates more details of an example system for automatically determining the grouping 16, 16' of the luminaries 4 in dependence on a formation of the people 6 and/or objects 7 in the space as detected using the positioning system 12, and for controlling the illumination emitted by those luminaires in dependence on the determined grouping 16, 16'.

The system comprises: the lighting control equipment 10, the positioning system 12, the luminaires 4, and, if used, the mobile devices 8. For illustrative purposes only one of the luminaires 4 and only one of the mobile device 8 are shown in FIG. 3, but it will be appreciated that each such luminaire 4 and mobile device 8 may be configured in accordance with that described in relation to FIG. 3.

The lighting control equipment 10 comprises a lighting controller 18, a lighting control interface 20, a positioning system interface 30, a commissioning database 19 and a user interface 21. Each of the lighting control interface 20, positioning system interface 30, commissioning database 19 and user interface 21 is operatively coupled to the lighting controller 18. The luminaire 4 comprises a luminaire controller 24, a driver 26, one or more lamps 28, and a lighting control interface 22. Each of the lighting control interface 22 and driver 26 is operatively coupled to the luminaire controller 24, and the driver 26 is operatively coupled to the one or more lamps 28.

The lighting control interface 20 of the lighting control equipment 10 is operatively coupled to the lighting control interface 22 of the luminaire 4, thereby enabling lighting controller 18 of lighting control equipment 10 to communicate with the luminaire controller 4 in order to cause it to control, via the driver 26, the respective contribution to the illumination emitted into the space 2 by the one or more lamps 28. This communication between the lighting controller 18 and luminaire controller 24 via the respective interfaces 20, 22 may be implemented by any of a variety of connections. In embodiments the connection may be a wired connection, e.g. implemented using a protocol such as an Ethernet or DMX, or using power line communication (PLC). Alternatively the connection may be a wireless connection implemented using a wireless communication protocol such as Wi-Fi, ZigBee, Bluetooth or Thread. Either way the connection may be a direct connection between the interfaces 20, 22 of the lighting control equipment 10 and each respective luminaire 4 or may be via one or more intermediate elements of a wired or wireless network. In some embodiments a combination of different connection types could even be used for different communications between the lighting controller 18 and luminaire controller 24, and/or for different hops via one or more intermediate networks elements.

Anywhere herein where certain functionality is attributed to the lighting control equipment 10 it will be understood that this may be performed under control of the lighting controller 18, and anywhere herein where the lighting control equipment 10 or lighting controller 18 is described as communicating with or controlling a luminaire 4, it will be understood that this may be implemented by the lighting controller 18 communicating with the respective luminaire controller 24 via the respective interfaces 20, 22 using any of the communication technologies mentioned above and/or others. Similarly where any functionality is attributed herein to a luminaire 4, it will be understood that this may be performed under the control of the respective luminaire controller 24 (and enacted via the driver 26 and one or more lamps 28). For brevity such details will not be repeated each time.

The positioning system 12 comprises a positioning system controller 34, a lighting control interface 32 and one or more positioning devices 36, e.g. an arrangement of presence sensors and/or an arrangement of reference nodes disposed throughout (or at least in range of) the space 2, and/or a 2D or 3D camera (configured to capture images in the visible, infrared and/or UV spectrum). Each of the lighting control interface 32 and the one or more positioning devices 36 is operatively coupled to the positioning system controller 34. The positioning system controller 24 is configured to detect the positions (locations) of at least some of the people 6 and/or nonhuman objects 7 in the space 2 using the one or more positioning devices 36, according to any of the positioning techniques already discussed above (e.g. triangulation, trilateration, multilateration and/or fingerprinting based on RSSI, ToF and/or AoA; and/or detecting IR emitted from a person's body or movement of the body; and/or detecting user interactions performed by people at known reference points). Anywhere herein where reference is made to positioning, or detecting the position of a person 6 or object 7, or the like, it will be appreciated that any such localization technologies and/or others may be used, and for brevity the different options will not be repeated each time.

The positioning system interface 30 of the lighting control equipment 10 is operatively coupled to the lighting control interface 32 of the positioning system 24, thereby enabling the positioning system controller 34 to report positioning information to the lighting controller 18, wherein the reported positioning information is indicative of the determined positions of the people 6 and/or objects 7 detected by the positioning system 12. This communication between the lighting controller 18 and positioning system controller 34 via the respective interfaces 30, 32 may again be implemented by any of a variety of connections. In embodiments the connection may be a wired connection, e.g. implemented using a protocol such as an Ethernet or DMX, or using power line communication (PLC). Alternatively the connection may be a wireless connection implemented using a wireless communication protocol such as Wi-Fi, ZigBee, Bluetooth or Thread. Either way the connection may be a direct connection between the interfaces 30, 32 of the lighting control equipment 10 and the positioning system may be via one or more intermediate elements of a wired or wireless network. In some embodiments a combination of different connection types could even be used for different communications between the lighting controller 18 and positioning system controller 34, and/or for different hops via one or more intermediate networks elements. Note also that the communication technology used to communicate between the lighting controller 18 and luminaire controller 24 may be the same or different than the communication technology used to communicate between the lighting controller 18 and the positioning system controller 34.

Anywhere herein where certain functionality is attributed to the positioning system 12 it will be understood that this may be performed under control of the positioning system controller 34, and anywhere herein where the positioning system 12 is described as communicating with the lighting control equipment 10, it will be understood that this may be implemented by the positioning system controller 34 communicating with the lighting controller 18 via the respective interfaces 30, 32 using any of the communication technologies mentioned above and/or others. For brevity such details will not be repeated each time.

Each of the lighting controller 18, luminaire controller 24, positioning system controller 34 and (if used) mobile device controller 40 may be implemented in the form of code stored on memory of the lighting control equipment 10, luminaire 4, positioning system 12 or mobile device 8 (respectively); and arranged to run on a processing apparatus of the lighting control equipment 10, luminaire 4, positioning system 12 or mobile device 8 (respectively); wherein the memory on which the code is stored may comprise one or more memory devices such as magnetic, electronic and/or optical memory devices implemented in one or more memory units at one or more physical locations, and the processing apparatus on which the code runs may comprise one or more processing units implemented at one or more physical locations. Alternatively any one or more of the lighting controller 18, luminaire controller 24, positioning system controller 34 and/or mobile device controller 40 may be implemented in the form of dedicated hardware circuitry, or configurable or reconfigurable hardware circuitry such as a PGA or FPGA, or any combination of hardware and software. The lighting control equipment 10 may take any of a variety of forms and may be implemented in a device within a single housing or distributed over multiple separate devices in separate housings at different physical locations, or even different geographical sites. Note also that where implemented over multiple separate devices (or indeed where the communications use more than one communication technology), each of the interfaces 20, 22, 30, 36 may represent multiple transceiver devices and/or multiple logical interfaces implemented through a given transceiver device.

As an example implementation, the lighting control equipment 10 may take the form of a server (comprising one or more server units at one or more geographical sites) and a user terminal coupled to the server via a local area network and/or a wide area network, e.g. via a wide area internetwork such as the Internet. In this case at least one of the commissioning database 19 and lighting controller 18 may be implemented on the server whilst at least the user interface 21 may be implemented on the user terminal; and each of the lighting controller 18, commissioning database 19, lighting interface 20 and positioning system interface 30 may be implemented on either the server or user terminal (e.g. the server may communicate with the luminaires 4 and/or positioning system 12 via a wired connection over the Internet, or the user terminal may communicate with the luminaires 4 via a wireless connection via a local area network).

In alternative implementations, the lighting control equipment 10 may all be implemented on a single device 10 such as a single user terminal, e.g. desktop computer, laptop computer, tablet, smartphone or dedicated lighting control device such as a wall panel. E.g. the lighting controller 18 may take the form of a lighting control app running on a portable user terminal such as a laptop, tablet, smartphone or even a smartwatch or smart-glasses, etc. In such embodiments the commissioning database 19 may comprise a local database implemented on the same terminal as the lighting controller 18, or may comprise a remote database stored on another user terminal or a server, or a combination of a local and remote database.

In yet further alternative implementations, the lighting controller 18 may take the form of a distributed control function distributed amongst some or all of the multiple luminaries 4. In this case the respective interfaces 20, 22 represent an internal interface, and the description herein of the lighting controller 18 and luminaire controller 24 represents a logical division of functionality. In such embodiments the lighting control equipment 10 is comprised by the luminaires 4. As another alternative, the lighting controller 18 may take the form of a distributed control function distributed amongst some or all of the positioning devices 36 (e.g. reference nodes or presence sensors). In this case the respective interfaces 30, 32 represent an internal interface, and the description herein of the lighting controller 18 and positioning system controller 34 represents a logical division of the functionality. In such embodiments the lighting control equipment 10 is comprised by the positioning devices. The lighting controller 18 may even be distributed between both the luminaires 4 and positioning devices 36. In any such embodiments the commissioning database 19 may comprise a distributed database that is distributed amongst the same devices (e.g. the luminaires 4) as the lighting controller 18, or may comprise a remote database stored on a user terminal or server, or a combination of any such implementations.

The positioning system 12 may also be implemented in any of a variety of forms. For instance, in embodiments the positioning system controller 34 may be implemented on a server which is coupled to the positioning device(s) 36 via a wired or wireless local area network and/or via a wide area network, e.g. a wide area internetwork such as the Internet (wherein the server may be implemented by one or more physical server units at one or more geographical sites). In other embodiments, the positioning system controller 34 may take the form of a distributed control function distributed between some or all the positioning devices 36 in the case where there are multiple positioning devices (e.g. reference nodes or presence sensors). Or if the positioning device is a single camera, in some embodiments the positioning system controller 34 may be embedded in the camera. Note that in some embodiments, some or all of the positioning system controller 34 could be implemented on the same device or devices as some or all of the lighting controller 18, e.g. on the same server (which again may comprise one or more physical server units at one or more geographical sites). As yet another possibility, the positioning is performed by reference to a plurality of reference nodes, but using coded light instead of RF signals. In this case the positioning devices 36 may be comprised by the luminaires 4, using the respective lamp(s) 28 to emit the respective beacon signal in the form of a coded light signal. In such embodiments, the positioning system controller 34 may take the form of a distributed control function distributed between the luminaires 4, or may take the form of a server coupled to the luminaires 4 (again via any suitable wired or wireless local or wide area network).

The mobile device 8 is shown in FIG. 3 as comprising a mobile device controller 40 and a mobile interface 38 operatively coupled to the mobile device controller 40, the mobile device controller 40 being arranged to communicate with the positioning devices 36 via the mobile interface 38 using any wireless communication technology such as Wi-Fi, Bluetooth, ZigBee or Thread. In the case where the positioning system 12 is configured to detect the position of a person 6 or object 7 based on beacons signals transmitted between the mobile device 8 and a plurality of the positioning devices 36 in the form of reference nodes, these signals are either sent from the mobile interface 38 under control of the mobile controller 40, or are received by the mobile controller 40 via the mobile interface 38. In the latter case (a device centric approach), the mobile controller 40 takes the measurements of the beacon signals and returns the measurements to the positioning controller 34 via the respective interfaces 38, 36; or even computes the position of the mobile device 8 locally at the mobile device 8 based on the received beacon signals and sends the result back to the positioning system controller 34 via the interfaces 38, 36. Note also that the returned measurements or result does not have to be sent back using the same wireless technology as used for the beaconing, in which case the interfaces 36, 38 represents more than one transceiver, transmitter or receiver. E.g. the beaconing may be performed using coded light and the measurements or results may be returned from the mobile device 8 to the positioning system 12 using an RF back channel.

Whatever form the various components take, the positioning system 12 is configured to detect the positions of at least some of the people 6 and/or nonhuman objects 7 in the space 2, and report an indication of the detected positions to the lighting controller 18. Based on this, the lighting controller 18 determines a spatial distribution (i.e. formation) of at least some of the people 6 and/or objects 7, and identifies one or more spatial regions within the space 2 corresponding to this distribution. The lighting controller 18 may determine the distribution of people 6 and/or objects 7 in one of at least two possible ways: (I) by the positioning system 12 reporting the individual positions of each of the detected people 6 and/or objects 7 to the lighting controller 18, and the lighting controller 18 computing the spatial region based on these; or (ii) by the location system 12 computing the spatial region based on the individual locations and reporting the computer region to the lighting controller 18.

Either way, the identification of a particular spatial formation of people 6 and/or objects 7, and the identification of the region corresponding to this formation, may be performed in a number of possible ways. For instance, first it may be detected whether or not any of the people 6 and/or objects 6 detected in the space have formed a cluster. In such cases, a cluster may be declared as present whenever greater than a predetermined density of people 6 (people per unit floor area) is detected within the space 2. As another example, whenever each of a predetermined number of people 6 in a set is detected to be within a threshold distance of at least one other of the people 6 in the set, then they may be detected as having formed a cluster. I.e. so if more than n people in a certain set are each within no more than x meters of at least one other people in the set, then the set may be declared as a cluster for the present purposes.

Similar techniques may be applied for detecting clusters of non-human objects 7 such as furniture. Further, in some embodiments the process may be configured to detect a cluster of a combination of one or more people 6 and one or more non-human objects 7. E.g. a cluster may be declared on the basis of greater than a predetermined threshold number of people 6 being detected within a predetermined distance of a predetermined object 7 (e.g. more than a certain number of people are clustering around a certain promotional display, product area or POS).

Based on the determined cluster, the lighting controller 18 then determines the spatial distribution (i.e. formation) of the cluster, i.e. an approximate indication of its shape. This corresponds to a certain region of space within the space 2. Note also that in some instances, the process may identify more than one cluster, and thus identify more than one respective region within the space 2 and the shape of each such region.

Alternatively, the process may simply consider all the people and/or objects 7 for the purpose of determining the shape of a region within the space 2, without a clustering criterion or criteria being applied. As another example, the process may identify a plurality of different regions based on different categories of people 6 and/or object 7. For example if the positioning system 12 can identify the people 6 it detects as falling in different categories, e.g. based on an ID of the respective mobile devices 8 or their users, or based on image recognition, then the different categories of people 6 may be analysed separately to detect the shape of the respective spatial distribution of each, and thus assign a different spatial region within the space 2 corresponding to each category. For instance, the lighting controller 18 or positioning system 12 may have access to a database of staff IDs and may thus distinguish between staff and other people, who may be assumed to be customers (or more generally patrons or members of the public). E.g. the positioning system 12 may detect the IDs embedded in the beacon signals emitted by the mobile devices 8, or reported from the mobile devices 8 to the positioning system 12 by other means (e.g. along with the signal measurements in a device centric arrangement). Alternatively or additionally, in a variant of this, the positioning system 12 may be able to distinguish between people 6 and nonhuman objects 7, and to determine the shape of a different spatial region corresponding to each.

By whatever means the one or more regions and their respective shapes (formations) are determined, based on this, the lighting controller 18 then determines a respective group 16 of the luminaires 4 corresponding to each of the one or more identified spatial regions in which people and/or objects 6 are grouped. To do this, the lighting controller 18 has access to a database mapping the locations of the luminaires 4 to their respective locations within the space 2. By comparing the location and shape of the determined region(s) to the known locations of the luminaires 4, the lighting controller 18 is thus able to identify the corresponding group 16 or groups of luminaires 4 which substantially contribute to the illumination of the region(s) in question.

The lighting controller 18 stores an indication of the identified luminaire group(s) 16 in the commissioning database 19, mapping IDs of the respective luminaires 4 in a given group 16 to an indication that these IDs are grouped, e.g. to a group ID. This thereby allows the luminaires of the group to be controlled as a group, i.e. by reference to the group as a whole, e.g. by reference to the group ID.

Over time, as the positions of the people 6 and/or objects 7 change (i.e. as they move), and/or as one or more of the people 6 and/or objects 7 enter or leave the space 2, then the process of detecting the spatial distribution of the one or more groups of people 6 and/or objects 7 and determining the corresponding one or more groups of luminaires 6 is repeated. This could be done periodically, and/or could be done in response to an event such as detecting movement, a change in position, a new person or object being detected in the space 2, or a previously-detected person or object in the space now being missing.

In further embodiments, the lighting controller 18 may be configured to store a record of the determined distribution of people 6 and/or objects 7 and/or a record of the determined grouping 16 of luminaires 4 in the commissioning database 19. The lighting controller 18 repeats this on multiple occasions over a periodic window of time such as a day, week, month, season and/or year (i.e. over multiple different times within that window when the distribution is substantially different so as to result in a different grouping 16 of luminaires 4). Based on this history, the lighting controller 18 can then build of a model of how the distribution of people 6 and/or nonhuman objects 7 is expected to behave over the window of time in question. Using this the lighting controller 18 may be configured to then predict the behaviour at a given time in a subsequent instance of the period question, e.g. a subsequent day, week, month season and/or year, by inputting the current time to the model. E.g. if customers have behaved in certain way in terms of their spatial distribution over the last week or month, then the lighting controller 18 may predict that they will do so again this week or month (or at least an approximation of this) in a subsequent week or month. Or if objects 7 such as the in-store furniture was observed by the system to have been arranged in a certain way in a certain month or season last year, then the lighting controller 18 may predict that they will be arranged in the same or a similar manner at the same time this year.

Note that the commissioning database 19 need not necessarily be a single file, single data structure or any other single monolithic entity. For instance in embodiments where the commissioning database 19 is used to record both the current grouping 16 and the history of past distributions or groupings, then the current grouping 16 and the history do not have to be stored in the same table, data structure or database file, though they could be. As discussed previously, nor does the commissioning database 19 have to be implemented on a single physical memory unit, server unit or terminal, though again it could be. Furthermore, note that the term database does not imply any particular size or amount of data, and could refer to anything from a small look-up table upwards.

According to the various embodiments discussed above, there is thus provided a system which dynamically adapts a grouping 16 of the luminaires 6 in response to detection of actual current or predicted usage of the space 2.

By whatever means the grouping 16 is determined, the lighting controller 18 is configured to output an indication of the one or more groups 16 of luminaires 4 to a user 14 (such as a store manager) via the user interface 21. N.B. in embodiments this user 14 is not a member of the public and/or not necessarily one of the people 6 in the space 2 (thought that is not excluded either). E.g. in embodiments the user 14 to whom the information on the grouping 16 is displayed may be a store or hotel manager whilst the people 2 in the space are members of the public.

This information may for instance be displayed to the user 14 by means of a graphical user interface displayed on a display screen of the user interface 12, e.g. showing the locations of the grouped luminaires 4, 16 on a floorplan or even a 3D model of the space 2. The lighting controller 18 is configured to then enable the user 14 to select the group 16 or one or more of the groups of luminaires 4 in order to control the luminaires of the group 16 as a single item (e.g. by reference to the database it has recorded mapping the luminaire IDs to the indication of the grouping(s) 16). For example the user 14 may select the group 16 of luminaires 4 by touching it on screen in the case of a touchscreen, or else selecting it with a pointing device such as a mouse, trackpad or trackerball, or by other means such as a keyboard shortcut. Thus the user 14 does not have to manually form the group(s) 16 him- or herself. Instead, the user 14 just selects the group 16 as a whole and then (also through the user interface 21) chooses a lighting effect or effect to apply to the group 16 together as a whole, e.g. to turn their emitted illumination on or off, or dim their emitted illumination up or down, or change the colour of their emitted illumination, or to control the illumination emitted from the group 16 to render a predefined spatial and/or temporal lighting pattern (a "lighting scene").

Alternatively however, the lighting controller 18 may be configured to automatically adapt the lighting emitted from the determined group. E.g. the lighting controller 18 may control the group 16 of luminaires 4 to give off a certain lighting effect in response to detecting greater than a threshold number of people 6 in the corresponding cluster, and/or at a certain time or date. E.g. the lighting controller 18 may implement a rule that says when a group of more than N (e.g. three) people are found within a region corresponding to a certain group of luminaires 4, then the light level emitted by those luminaires is increased to a maximum. In further embodiments the controller may allow both manual and automatic modes of controlling the illumination emitted by the group 16 of luminaires 4.

The following describes an example of a particular use case in retail, such as in a clothes store. Nevertheless, it will be understood that the techniques disclosed herein can be applied to different sorts of applications, like meeting rooms, museums, etc.

In embodiments, an Indoor Positioning System (IPS) 12 is available in the store 2. The IPS 12 can be based on different technologies (visible light communication, Bluetooth Low energy, WiFi triangulation, etc.) and can track the position of customers 6 (carrying a smartphone or smart wearable device 8 compatible with the IPS 12 and running the related app). The IPS functionalities are extended with algorithms that can detect groups of people 6 in the same area, based on the measurement of the distances among them from the position information.

In the store 2, a networked lighting system 4, 10 is available. The system is commissioned in such a way that the position of each luminaire 4 is known to the system and that the luminaires 4 are all individually addressable. The lighting system 4, 10 can communicate with the IPS 12. In a preferred embodiment, the IPS 12 and lighting system 4, 10 may be fully integrated, e.g. a visible-light communications (VLC) based IPS. The luminaires 4 can be controlled via a UI 21 that can be operated by e.g. the store manager 14 via a PC, smartphone or tablet, etc.

In a preferred embodiment, whenever the IPS 12 detects the creation of a group of people 6, this information is provided to the lighting system 10. The lighting system 10 automatically creates one or more group of luminaires 4 in the area where the group is located and this group is automatically presented in the control UI 21, so that the store manager 14 can use it to trigger a specific light effect (e.g. increase light level, change colour, etc.) from those luminaires 4 that belong to the newly formed group.

In another embodiment, the information about groups of people 6, their position and their dynamics in time can be stored by the IPS 12 in a secured database 19. This information can then be analysed via data analytics techniques to identify the optimal structure for the groups 16 of luminaires 4 in order for the store manager 14 to operate the lighting system 4, 10 in an efficient way based on the real shopping behaviour of the customers 6 in time.

In another embodiment, the position of the moveable items 7 in the store, such as moveable clothes racks, is as well tracked, e.g. by using mobile devices 8 attached to the items 7, in order to detect the layout of the store 2 and of the goods being exposed. This information can be used to automatically create other groups 16 of luminaires 4 that can be used by e.g. the store manager 14 to trigger light effects around the moveable racks. It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Equipment for automatically commissioning a lighting system comprising a plurality of luminaires for illuminating one or more regions within a space, the equipment comprising:

a positioning system interface configured to receive signals from a positioning system, indicating a respective location within said space at which each of a plurality of physical entities is detected by the positioning system, each of the entities being a person or a movable nonhuman object;

a controller configured to control the plurality of luminaires and configured to determine a spatial distribution of at least some of said entities based on the locations indicated by the signals from the positioning system, and to determine a region within said space corresponding to said spatial distribution, said region being smaller than said space; and wherein the controller is configured to identify a group of the luminaires that are arranged to illuminate said region and to store identifiers of the luminaires of the group together as a group in a commissioning database, the group of luminaires being fewer than the plurality of luminaires of the lighting system, and wherein the controller is configured to control the group of luminaires together.

2. The equipment of claim 1, wherein the controller is configured to:

store information on said region or locations in the commissioning database;

repeat, on multiple occasions over a period of time, the receiving of the signals from the positioning system, the determination of the distribution of entities and the corresponding region within the space based on the received signals, and the storing of said information;

analyse the stored information from the multiple occasions in order to estimate a time-varying distribution of the entities over said period; and perform the identification of said group of luminaires based on the time-varying distribution evaluated at a current time within a subsequent instance of said period.

3. The equipment of claim 2, wherein the equipment comprises a lighting interface configured to enable the controller to control the illumination emitted by the luminaires; and the controller is further configured to selectively control the illumination emitted by the group luminaires based on said creation of the group of luminaires.

4. The equipment of claim 3, wherein the equipment comprises a user interface, and wherein the controller is configured such that said selective control comprises: outputting an indication of the identified group of luminaires to a user via the user interface, in response receiving back a user input via the user interface by which the user selects to control the group of luminaires, and controlling the illumination emitted by the group of luminaires based on said user input.

5. The equipment of claim 1, wherein the controller is configured, subsequent to the determination of said group of luminaires, to:

operate the positioning system interface to receive one or more further signals from the positioning system, indicative of a respective updated location of each of one or more of said plurality of physical entities, and/or of one or more newly present physical entities being people and/or nonhuman movable objects newly detected in the space;

determine an updated spatial distribution based on the updated locations, and determine an updated region within the space corresponding to the updated spatial distribution, the updated region being smaller than said space; and in place of said group, identify an updated group of the luminaires that are arranged to illuminate the updated region, and store identities of the updated group of luminaires together as a group in a commissioning database, the updated group being fewer than said plurality of luminaires of the lighting system.

6. A system comprising the equipment of claim 1, and further comprising the positioning system, the positioning system being arranged to detect the locations of said entities.

7. The system of claim 6, wherein one, some or all more of said entities are people, the positioning system being arranged to detect the locations of the people.

8. The system of claim 6, wherein one, some or all of the entities are nonhuman movable objects, the positioning system being arranged to detect the locations of the movable nonhuman objects.

9. The system of claim 7, wherein one or more of said entities are people and one or more others of said entities are nonhuman movable objects.

10. The system of any of claim 5, wherein for each respective one of one, some or all of said entities, the positioning system is arranged to detect the location of the respective entity by reference to wireless signals transmitted between a mobile device attached to or carried by the respective entity and a plurality of reference nodes within range of the mobile device.

11. The system of claim 6, wherein one or more of the mobile devices are wearable devices worn by the receptive people.

12. The system of claim 6, wherein for each respective one of one, some or all of said entities, the positioning system is arranged to detect the location of the respective person based on detecting a wireless signal emitted by or reflected from the respective person's body.

13. The system of claim 6, wherein for each respective one of one, some or all of said entities, the positioning system is arranged to detect the location of the respective person based on the user interacting with a reference point in said space.

14. A computer program product for automatically commissioning a lighting system comprising a plurality of luminaires for illuminating one or more regions within a space, wherein the computer program product comprises code embodied on a computer-readable storage medium and configured so as when run on one or more processing devices to perform operations of:

receiving signals from a positioning system, indicating a respective location within said space at which each of a plurality of physical entities is detected by the positioning system, each of the entities being a person or a movable nonhuman object;

determining a spatial distribution of at least some of said entities based on the locations indicated by the signals from the positioning system, and determining a region within said space corresponding to said spatial distribution, said region being smaller than said space; and identifying a group of the luminaires that are arranged to illuminate said region and storing identifiers of the luminaires of the group together as a group in a commissioning database the group of luminaires being fewer than the plurality of luminaires of the lighting system.

15. A method of automatically commissioning a lighting system comprising a plurality of luminaires for illuminating one or more regions within a space, wherein the method comprises:

receiving signals from a positioning system, indicating a respective location within said space at which each of a plurality of physical entities is detected by the positioning system, each of the entities being a person or a movable nonhuman object;

determining a spatial distribution of at least some of said entities based on the locations indicated by the signals from the positioning system, and determining a region within said space corresponding to said spatial distribution, said region being smaller than said space; and identifying a group of the luminaires that are arranged to illuminate said region and storing identifiers of the luminaires of the group together as a group in a commissioning database, the group of luminaires being fewer than the plurality of luminaires of the lighting system.

* * * * *